(12) United States Patent
Lin et al.

(10) Patent No.: US 11,384,519 B2
(45) Date of Patent: Jul. 12, 2022

(54) WALL MOUNT BASE DEVICE

(71) Applicant: Xiamen Solex High-Tech Industries Co., Ltd., Xiamen (CN)

(72) Inventors: Zhichun Lin, Xiamen (CN); Zhinan Huang, Xiamen (CN); Donghai Chen, Xiamen (CN)

(73) Assignee: Xiamen Solex High-Tech Industries Co., Ltd., Xiamen (CN)

( * ) Notice: Subject to any disclaimer, the term of this patent is extended or adjusted under 35 U.S.C. 154(b) by 0 days.

(21) Appl. No.: 17/188,235

(22) Filed: Mar. 1, 2021

(65) Prior Publication Data
US 2021/0270020 A1    Sep. 2, 2021

(30) Foreign Application Priority Data
Feb. 28, 2020    (CN) .......................... 202010127476.7

(51) Int. Cl.
*B05B 1/10* (2006.01)
*E03C 1/06* (2006.01)
*F16M 13/02* (2006.01)
*B05B 1/18* (2006.01)

(52) U.S. Cl.
CPC ................ *E03C 1/06* (2013.01); *B05B 1/185* (2013.01); *F16M 13/022* (2013.01)

(58) Field of Classification Search
CPC .......... E03C 1/26; B05B 1/185; F16M 13/022
USPC .......... 248/75; 239/446, 140, 273, 282, 283
See application file for complete search history.

(56) References Cited

U.S. PATENT DOCUMENTS

| 10,016,769 | B2* | 7/2018 | Yin ........................ B05B 1/1654 |
| 2017/0320071 | A1* | 11/2017 | Hu ........................ B05B 1/1636 |
| 2019/0054479 | A1* | 2/2019 | Luo ........................... B05B 1/16 |
| 2021/0293008 | A1* | 9/2021 | Lin ......................... B05B 1/185 |

* cited by examiner

*Primary Examiner* — Todd M Epps
(74) *Attorney, Agent, or Firm* — Cooper Legal Group, LLC

(57) ABSTRACT

The present disclosure discloses a wall mount base device. The wall mount base device comprises a wall mount bracket and a hanging member configured to be hung on the wall mount bracket. The wall mount bracket is disposed with a hanger, and the hanger comprises a locking groove. The hanging member is disposed with a locking mechanism, and the locking mechanism comprises one or more locking members, a transmission mechanism, and an operating member. The hanging member is configured to detachably cooperate with and encompass an outer side of the hanger, and the hanger cooperates with and is encompassed in the hanging member disposed on an outer side of the hanger. When the one or more locking members are disposed at the locked positions, the one or more locking members are disposed in the locking groove to enable the hanging member to be locked to the wall mount bracket.

11 Claims, 5 Drawing Sheets

WALL MOUNT BASE DEVICE

RELATED APPLICATIONS

This application claims priority to Chinese patent application number 202010127476.7, filed Feb. 28, 2020. Chinese patent application number 202010127476.7 is incorporated herein by reference.

FIELD OF THE DISCLOSURE

The present disclosure relates to parts for kitchens and bathrooms, and in particular relates to a wall mount base device.

BACKGROUND OF THE DISCLOSURE

Existing wall mount base devices, such as wall mount base devices of hand-held showers, comprise a wall mount bracket and a hand-held shower, and the wall mount bracket is secured on a wall. The wall mount bracket is disposed with an insertion hole that penetrates up and down, and the insertion hole has an opening that penetrates both inside and outside and up and down. An inner wall of the insertion hole tapers to get gradually smaller from top to bottom, and the hand-held shower can be detached from and inserted into the insertion hole. The hand-held shower can be locked and positioned by its own weight by the arrangement getting gradually smaller. Since the hand-held shower only uses its own gravity to lock the connection with the insertion hole, the hand-held shower may be taken out of the insertion hole by mistake (such as by a child), so there is a need for further improvement. In view of the above-mentioned shortcomings, some people have proposed a solution. The wall mount bracket is disposed with an insertion hole and a locking mechanism that penetrates up and down. The hand-held shower can be detachably inserted into the insertion hole. The locking mechanism is connected to the wall mount bracket and the hand-held shower to enable the hand-held shower to be positioned due to a locking of the locking mechanism, and the hand-held shower is pulled out due to a releasing of the locking mechanism. Although this solution can meet the above requirements, it has the following shortcomings: the locking structure is disposed on the wall mount bracket, so in the process of removing the hand-held shower, the user needs to control the locking mechanism on the wall mount bracket with one hand and to release the hand-held shower with another hand. It is inconvenient to raise the hand-held shower with one hand.

BRIEF SUMMARY OF THE DISCLOSURE

The present disclosure provides a wall mount base device to solve the deficiencies of the wall mount base device of the existing techniques.

In order to solve the technical problems, a technical solution of the present disclosure is as follows.

A wall mount base device comprises a wall mount bracket, and a hanging member configured to be hung on the wall mount bracket. The wall mount bracket is disposed with a hanger, and the hanger comprises a locking groove. The hanging member is disposed with a locking mechanism, the locking mechanism comprises one or more locking members, a transmission mechanism, and an operating member, and the one or more locking members are configured to move between locked positions and released positions relative to the hanging member. The operating member is movably connected to the hanging member, and the transmission mechanism is connected between the operating member and the one or more locking members to drive the one or more locking members to move due to a movement of the operating member. When the one or more locking members are disposed at the locked positions, the one or more locking members are disposed in the locking groove to enable the hanging member to be locked to the wall mount bracket.

In an embodiment, the hanging member is disposed with a sleeve groove. When the one or more locking members are disposed at the locked positions, the one or more locking members protrude to be disposed in the sleeve groove, and the sleeve groove of the hanging member is configured to detachably cooperate with and encompass an outer side of the hanger.

In an embodiment, the wall mount bracket is disposed with an abutting surface, the hanger protrudes from the abutting surface, and the abutting surface is disposed around the hanger.

In an embodiment, an annular groove disposed around the hanger defines the locking groove.

In an embodiment, the hanging member comprises one or more elastic members, and the one or more elastic members are connected between the locking mechanism and the hanging member to enable the locking mechanism to be reset. When the one or more locking members of the locking mechanism are reset, the one or more locking members are disposed at the locked positions.

In an embodiment, the transmission mechanism comprises a rotating circle configured to rotate relative to the hanging member, and the operating member is operatively connected to the rotating circle to drive the rotating circle to rotate. The rotating circle is disposed with one or more cam surfaces, the one or more locking members are configured to be slidably connected to the hanging member, the one or more locking members are disposed with one or more matching portions, and the one or more matching portions abut the one or more cam surfaces to drive the one or more locking members to slide due to a rotation of the rotating circle.

In an embodiment, the one or more locking members comprise a plurality of locking members, and the plurality of locking members are circumferentially disposed at intervals. Sliding directions of the plurality of locking members are disposed in radial directions of the rotating circle. The one or more cam surfaces comprise a plurality of cam surfaces, and the plurality of cam surfaces are circumferentially disposed at intervals.

In an embodiment, the transmission mechanism comprises a push rod, and the push rod is disposed with a screw rack. The rotating circle is disposed with a gear, and the gear is engaged with the screw rack. The operating member is operatively connected to the push rod to drive the push rod to slide.

In an embodiment, a rear surface of the hanging member is concave to define a sleeve groove so as to define a blind hole type. The sleeve groove comprises a groove bottom and a groove wall, the rotating circle comprises a bottom wall and a peripheral wall axially extending from a periphery of the bottom wall, the bottom wall is disposed in the hanging member and corresponds to the groove bottom, and the peripheral wall encompasses an outer side of the groove wall. An outer peripheral surface of the peripheral wall is disposed with the plurality of cam surfaces, inner ends of the plurality of locking members protrude to define the one or more matching portions, the one or more matching portions abut the plurality of cam surfaces, and outer ends of the plurality of locking members slides through the groove wall.

In an embodiment, one or more elastic members configured to enable the plurality of locking members to be reset are disposed between the plurality of locking members and the hanging member.

In an embodiment, the hanging member is a hand-held shower.

Compared with the existing techniques, the technical solution has the following advantages.

In this technical solution, the locking mechanism for locking the wall mount bracket and the hanging member is disposed on the hanging member, and the operating member for controlling the locking mechanism is also disposed on the hanging member, so that the user can control the hanging member at the same time while holding the hanging member. Therefore, the wall mount base device can realize one-handed taking and placing of the hanging member and can also remotely control the taking and placing (not at the wall mount bracket), which is more user-friendly and easier and faster. The hanging member is locked on the wall mount bracket by inserting the locking members into the locking groove. The locking is firm and reliable, and the structure is particularly suitable for one-handed taking and placing of the hanging member.

The hanging member is locked to the wall mount bracket by a combination of the sleeve groove of the hanging member being sleeved an outer side of the hanger and the locking members being inserted into the locking groove to lock the hanging member on the wall mount bracket. The locking is firmer and reliable. Moreover, the structure is particularly suitable for one-handed taking and placing of the hangers.

The locking groove is an annular groove disposed around the hanger, which is convenient for locking and improves the convenience of operation.

The transmission mechanism comprises a rotating circle that can rotate relative to the hanging member. The operating member is connected to the rotating circle to drive the rotating circle to rotate. The rotating circle is disposed with a cam surface. The locking member can be slidably connected to the hanging member. The locking member is disposed with a matching portion. The matching portion is matched with and abuts the cam surface to drive the locking member to slide through the rotation of the rotating circle. The rotating circle rotates and matches with the cam surface to control the sliding of the locking member, and the control is convenient and the precision is high. The rotating circle can control multiple circumferentially spaced locking members at the same time to improve the synchronization of locking and releasing and improve locking performance and release performance. The structure is simple, compact, and has good operation stability.

The push rod is disposed with a screw rack, the rotating circle is disposed with a gear, and the gear is engaged with the screw rack. The operating member is connected to the push rod to drive the push rod to slide. The structure is simple and compact, and the operation stability is good.

BRIEF DESCRIPTION OF THE DRAWINGS

The present disclosure will be further described below in combination with the accompanying drawings and embodiments.

Figure 1:
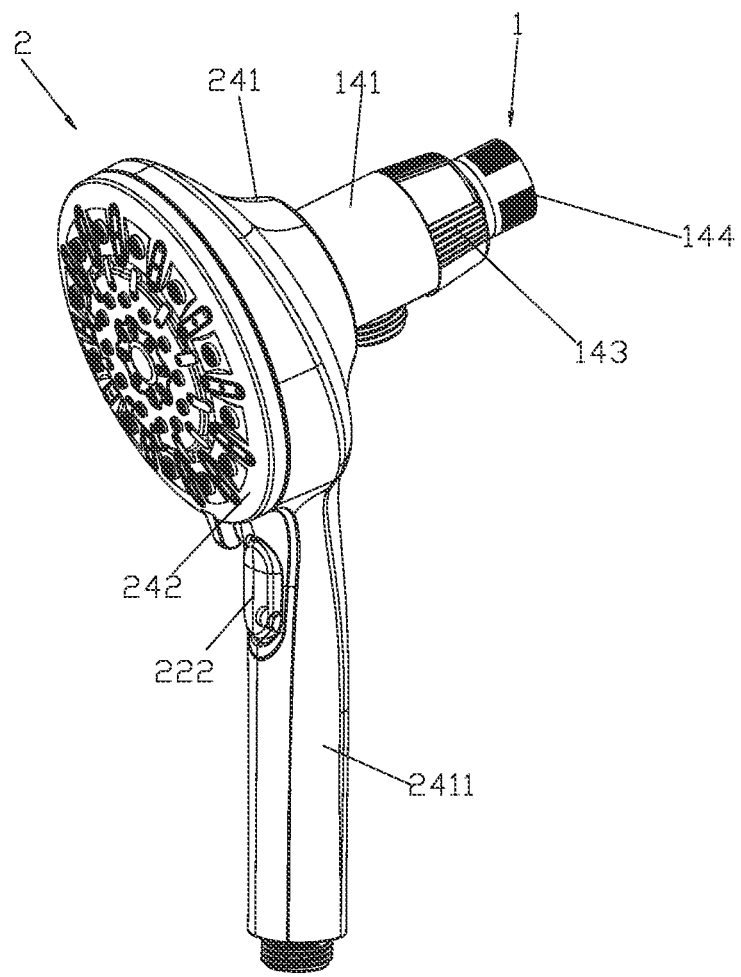
FIG. 1 illustrates a perspective view of a wall mount base device according to an embodiment.

Reference numbers: wall mount bracket 1, hanger 11, abutting surface 12, locking groove 13, housing 141, circular block 142, screw nut 143, ball head 144; hanging member 2, transmission mechanism 20, sleeve groove 21, groove bottom 211, groove wall 212, locking mechanism 22, locking member 221, matching portion 2211, operating member 222, rotating circle 223, gear 2231, cam surface 2232, first shaft 2233, second shaft 2234, push rod 224, screw rack 2241, swinging member 225, elastic member 23, elastic piece 231, body 241, cover portion 242, water division mechanism 243, hand-held part 2411, water inlet part 244, fixed base 2431, water division body 2432, installation cavity 240, bottom wall 2235, peripheral wall 2236, arc structure 2251.

DETAILED DESCRIPTION OF THE EMBODIMENTS

Figure 2:
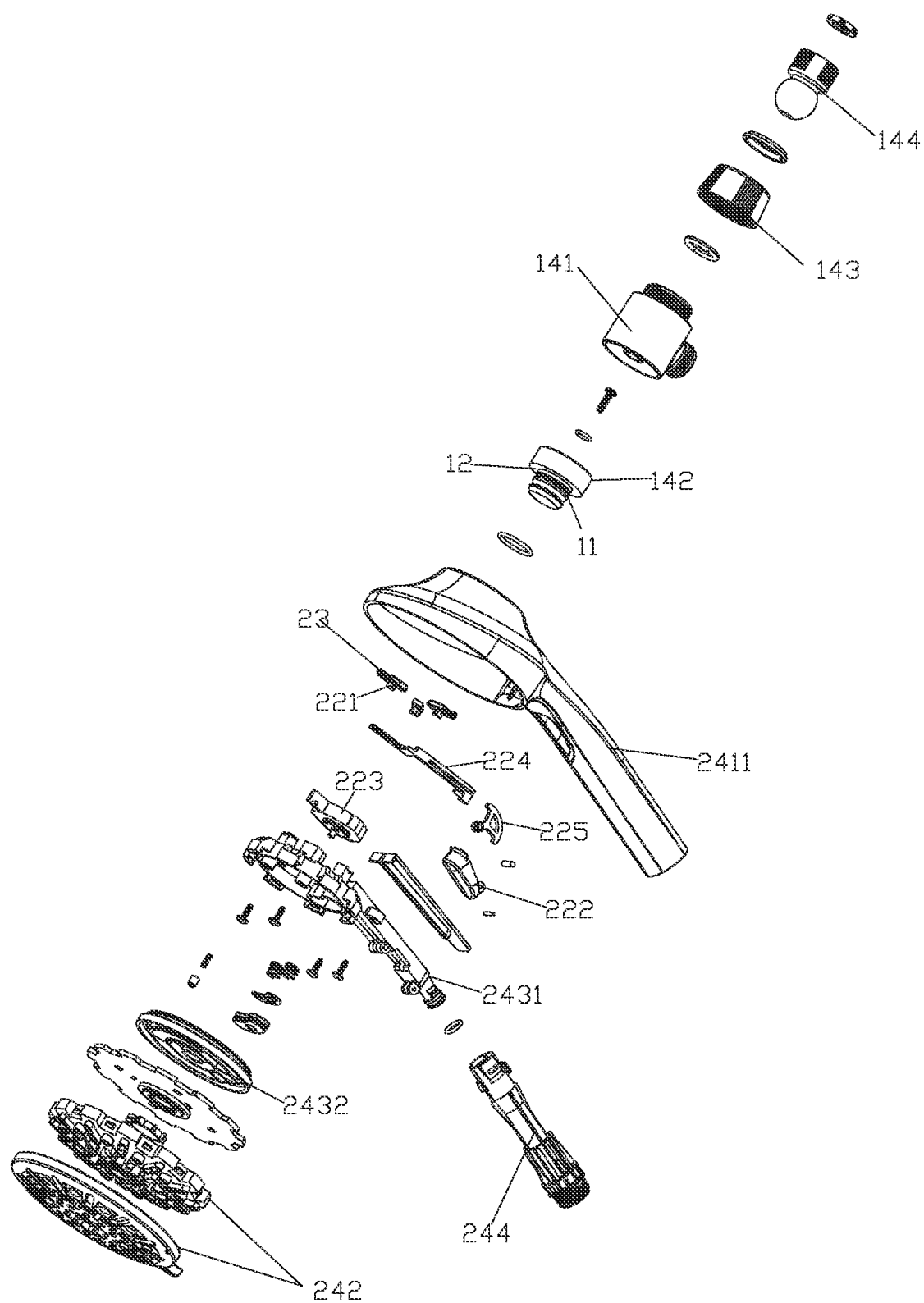
FIG. 2 illustrates an exploded perspective view of the wall mount base device of the embodiment.
Figure 3:
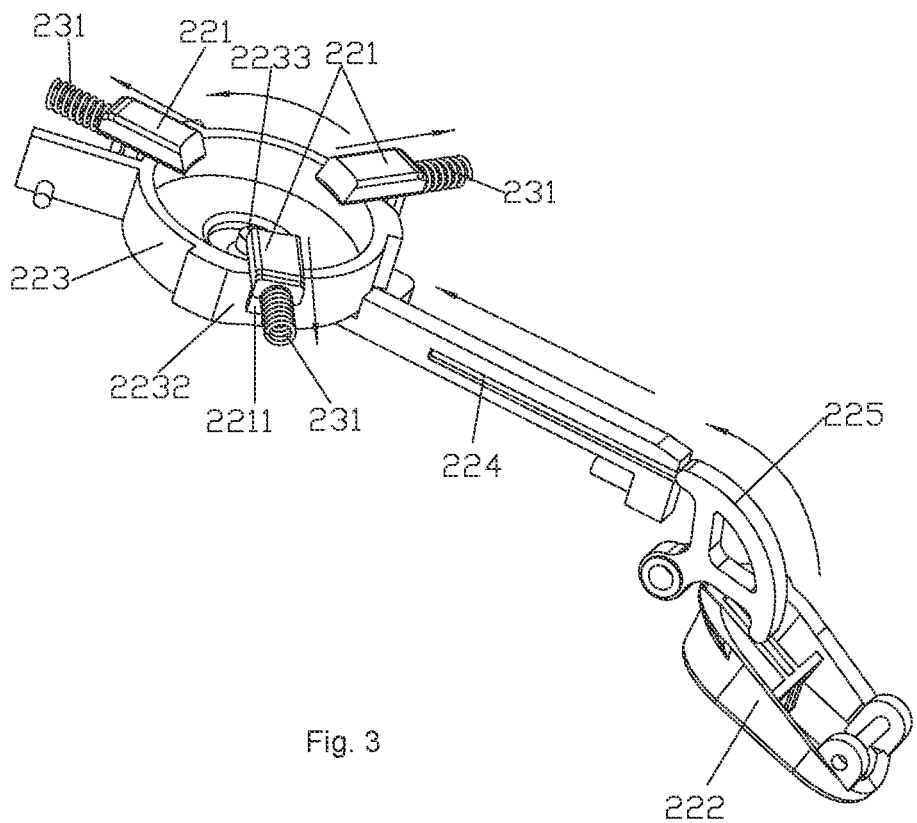
FIG. 3 illustrates a first perspective view of a locking mechanism of the wall mount base device of the embodiment.
Figure 4:
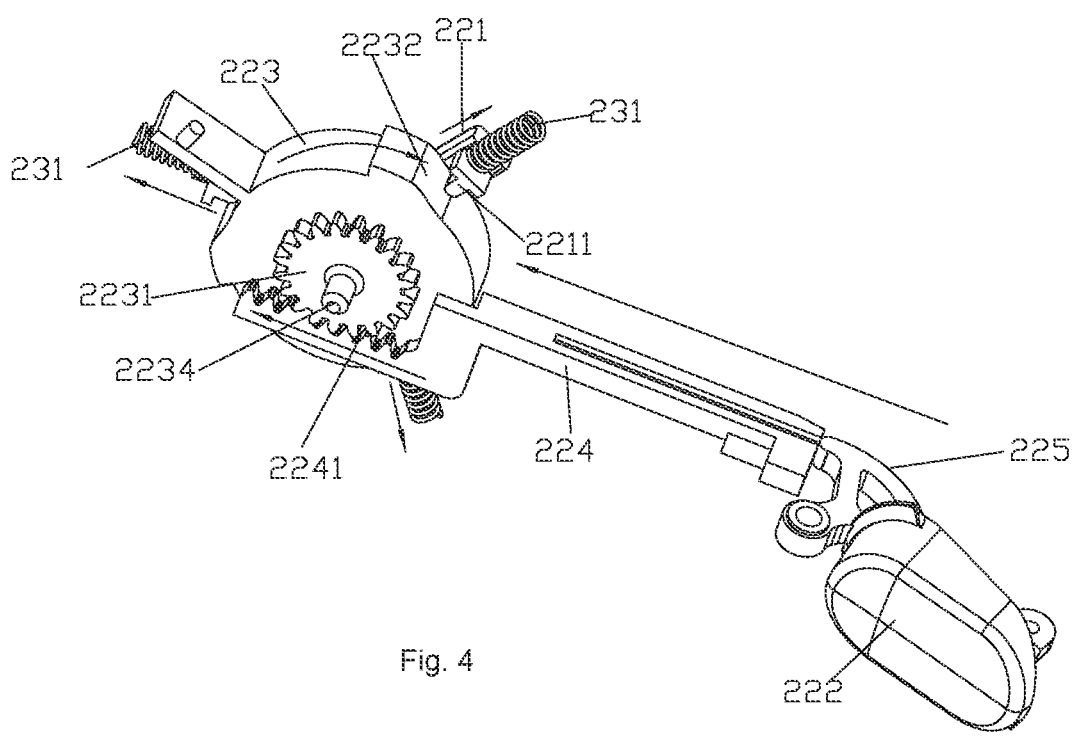
FIG. 4 illustrates a second perspective view of the locking mechanism of the wall mount base device of the embodiment.
Figure 5:
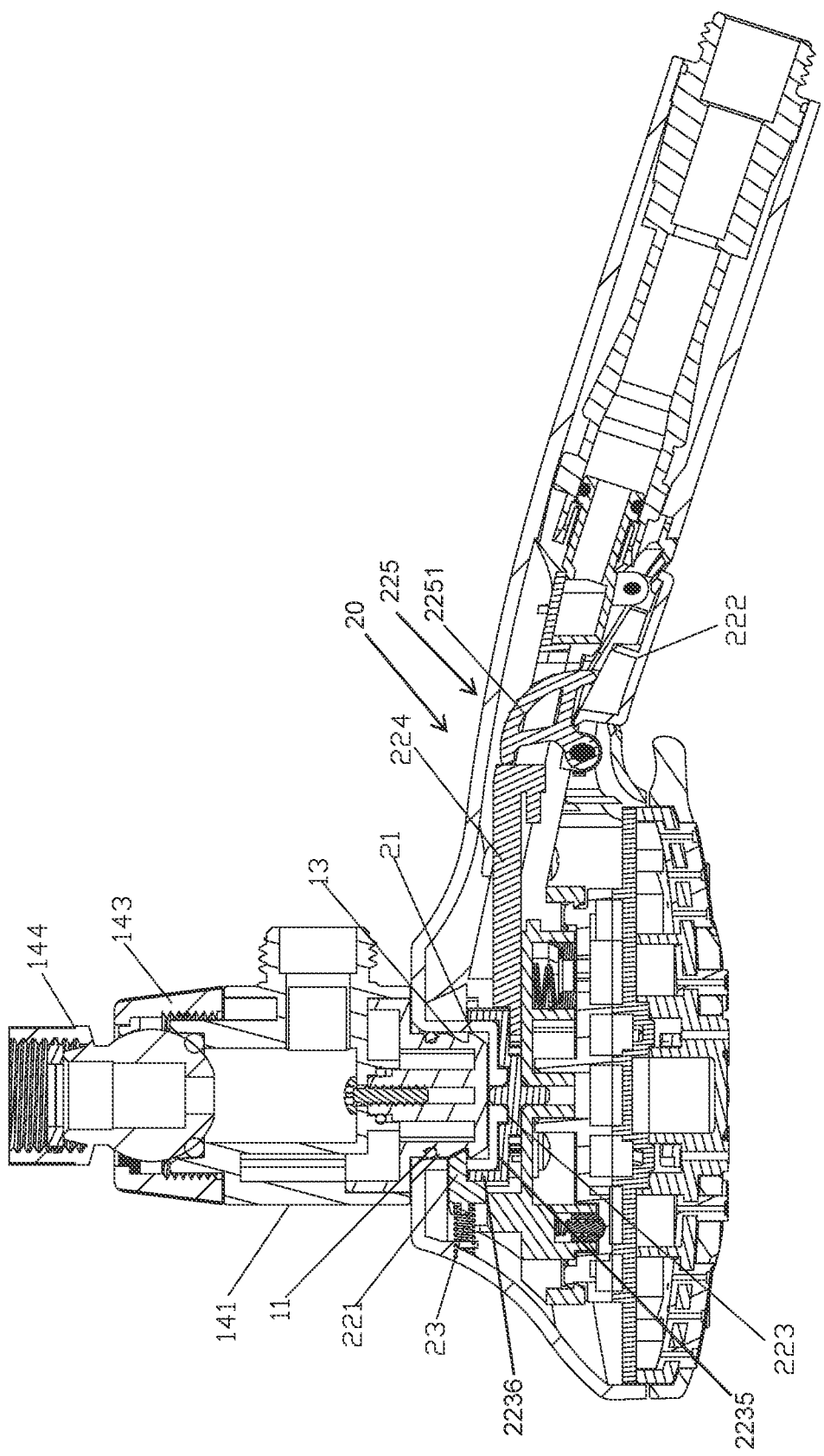
FIG. 5 illustrates a first cross-sectional view of the wall mount base device of the embodiment.
Figure 6:
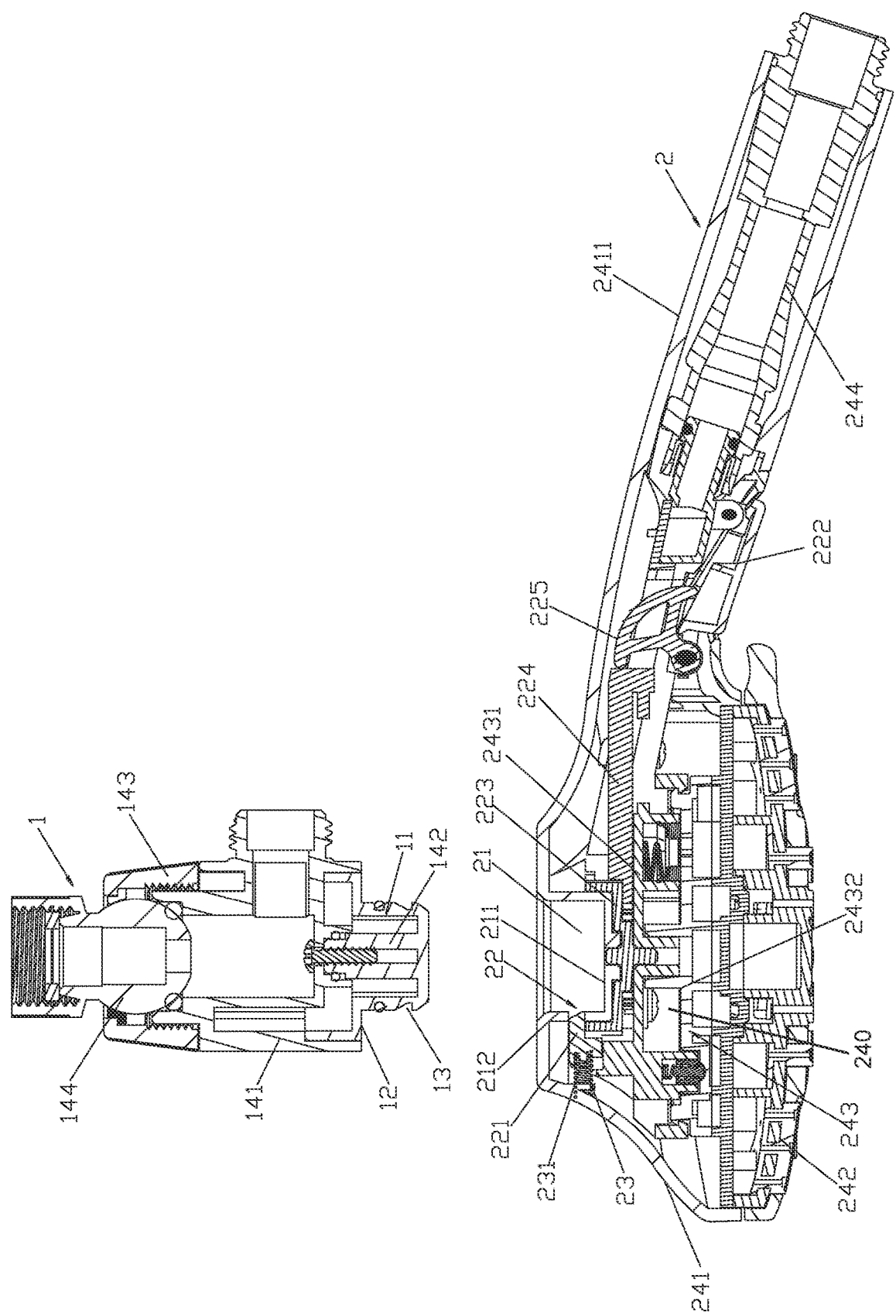
FIG. 6 illustrates a second cross-sectional view of the wall mount base device of the embodiment.

Referring to FIGS. 1-6, a wall mount base device comprises a wall mount bracket 1 and a hanging member 2 configured to be hung on the wall mount bracket 1. The hanging member 2 is a hand-held shower. As needed, it can also be other parts.

The wall mount bracket 1 is disposed with a hanger 11 and an abutting surface 12. The hanger 11 protrudes from the abutting surface 12, and the abutting surface 12 is disposed around the hanger 11. The hanger 11 comprises a locking groove 13, and the locking groove 13 defines an annular groove circumferentially disposed on the hanger 11. In some embodiments, the wall mount bracket 1 comprises a housing 141 and a circular block 142, and the circular block 142 is secured to the housing 141. The circular block 142 is disposed with the hanger 11 and the abutting surface 12, and the housing 141 is secured on a wall by a screw nut 143 and a ball head 144 or other coupling mechanism. As needed, the wall mount bracket 1 can be disposed with a waterway part configured to be in communication with a water supply source, and the hand-held shower (i.e., the hanging member 2) is configured to be connected to the waterway part through a hose.

The hanging member 2 is disposed with a sleeve groove 21, a locking mechanism 22, and elastic members 23. The locking mechanism 22 comprises a plurality of locking members 221, a transmission mechanism 20, and an operating member 222. Each of the plurality of locking members 221 is configured to slide between a locked position and a released position relative to the hanging member 2. The operating member 222 is movably connected to the hanging member 2, and the transmission mechanism 20 is connected between the operating member 222 and the plurality of locking members 221 to drive the plurality of locking members 221 to slide due to a movement of the operating member 222. When the plurality of locking members 221 are disposed at the locked position, the plurality of locking members 221 protrude to be disposed in the sleeve groove 21. The sleeve groove 21 of the hanging member 2 is configured to detachably cooperate with and encompass an outer side of the hanger 11 and cooperate with and be encompassed in the locking groove 13. When the plurality of locking members 221 are disposed at the locked position, the plurality of locking members are disposed in the locking groove 13 to enable the plurality of hanging members 2 to be locked to the wall mount bracket 1. The elastic members 23 are connected between the plurality of locking mechanisms 22 and the hanging member 2 to enable the locking mechanism 22 to be reset, the plurality of locking members 221 of the locking mechanism 22 are reset, and the plurality of locking members 221 are disposed at the locked position.

The transmission mechanism 20 comprises a rotating circle 223 configured to rotate relative to the hanging member 2 and a push rod 224. The push rod 224 is disposed with a screw rack 2241, and the rotating circle 223 is disposed with a gear 2231. The gear 2231 is engaged with the screw rack 2241. The operating member 222 is operatively connected to the push rod 224 to drive the push rod 224 to slide, and the push rod 224 slides to drive the rotating circle 223 to rotate. The plurality of locking members 221 are circumferentially disposed in an annular array at intervals (i.e., an axis of the annular array coincides with a rotation axis of the rotating circle 223), and a sliding direction of the plurality of locking members 221 are disposed in radial directions (i.e., the radial directions relative to the rotation axis of the rotating circle 223). The rotating circle 223 is disposed with a plurality of cam surfaces 2232, and the plurality of cam surfaces 2232 are circumferentially disposed at intervals in an annular array. The plurality of locking members 221 are disposed with matching portions 2211, and the matching portions 2211 abut and cooperate with the plurality of cam surfaces 2232 to drive the plurality of lock members 221 to slide due to a rotation of the rotating circle 223. In some embodiments, a swinging member 225 is disposed between the push rod 224 and the operating member 222, a first end of the swinging member 225 is rotatably connected to the hanging member 2, and a second end of the swinging member 225 is disposed with an arc structure 2251. A first end of the arc structure 2251 abuts the operating member 222 and a second end of the arc structure 2251 abuts the push rod 224. Therefore, the operating member 222 drives the swinging member 225 to swing, and the swinging member 225 swings to push the push rod 224 to slide. The structure can improve stability and convenience of the transmission, and the structure is more compact.

In some embodiments, a rear surface of the hanging member 2 is concave to define the sleeve groove 21 so as to define a blind hole type. The sleeve groove 21 comprises a groove bottom 211 and a groove wall 212. The rotating circle 223 comprises a bottom wall 2235 and a peripheral wall 2236 axially extending from a periphery of the bottom wall 2235. The bottom wall 2235 is disposed in the hanging member 2, and a rear surface of the bottom wall 2235 abuts the groove bottom 211. The peripheral wall 2236 encompasses an outer side of the groove wall 212, and an outer peripheral surface of the peripheral wall 2236 is disposed with the plurality of cam surfaces 2232. Inner ends of the plurality of locking members 221 protrude to define the matching portions 2211 to define L-shaped structures (i.e., structures similar with an L-shape). The matching portions 2211 abut the plurality of cam surfaces 2232, and outer ends of the plurality of locking members 221 slide through the groove wall 212 (i.e., holes of the groove wall 212). The outer ends of the plurality of locking members 221 are disposed on an end surface of the peripheral wall 2236 or slidably abut the end surface of the peripheral wall 2236. Each of the elastic members 23 comprises an elastic piece 231 disposed between each of the plurality of locking members 221 and the hanging member 2, and the elastic pieces 231 are configured to enable each of the plurality of locking members 221 to be reset.

In some embodiments, the hanging member 2 comprises a body 241 and a cover portion 242. The body 241 is hermetically connected to the cover portion 242, and an installation cavity 240 is defined between the body 241 and the cover portion 242. The installation cavity 240 is disposed with a water division mechanism 243. The water division mechanism 243 is connected to the cover portion 242 to select water spray according to needs. The water spray is, for example, shower water, aerated water, rotating water, massage water, etc. A rear surface of the body 241 is concave to define the sleeve groove 21. The body 241 is disposed with a hand-held part 2411, and the operating member 222 is configured to be swingably connected to the hand-held part 2411. The hand-held part 2411 is disposed with a water inlet part 244 in communication with the water division mechanism 243, and the water inlet part 244 may comprise a shaft, etc. The water division mechanism 243 comprises a fixed base 2431 secured in the installation cavity 240 and a water division body 2432 configured to move relative to the fixed base 2431. The water division body 2432 moves relative to the fixed base 2431 to achieve waterway switching. Movements of the water division body 2432 are existing technology and can comprise rotation, sliding, etc. The back surface of the bottom wall 2235 of the rotating circle 223 protrudes to define a first shaft 2233. The gear 2231 is secured on a front surface of the bottom wall 2235, and a front surface of the gear 2231 protrudes to define a second shaft 2234. The first shaft 2233 is rotatably connected to the body 241, and the second shaft 2234 is rotatably connected to the fixed base. The above-mentioned structure improves rotation stability, improves reliability of locking or releasing, and is compact.

A process for hanging the hanging member 2 on the wall mount bracket 1 or removing the hanging member 2 from the wall mount bracket 1 is as follows. First, removing the hanging member 2 from the wall mount bracket 1: pressing the operating member 222, the operating member 222 moving upward to rotate counterclockwise, and then pushing the push rod 224 to move in a left direction. The push rod 224 is disposed with the screw rack 2241 to drive the rotating circle 223 comprising gear 2231 to rotate counterclockwise (referring to FIG. 3) to drive the plurality of locking members 221 to radially move outward. Therefore, a locked state between the plurality of locking members 221 and the locking groove 13 is released, and the hanging member 2 is taken out. After taking the hanging member 2 out, releasing the pressing of the operating member 222, and the locking mechanism 22 is reset. Second, hanging the hanging member 2 on the wall mount bracket 1: when placing the hanging member 2, the hanger 11 disposed on the wall mount bracket 1 pushing the plurality of locking members 221 of the hanging member 2 to radially move outward, and then the plurality of locking members 221 resetting due to the elastic members 23 to be snapped in the locking groove 13 to enable the hanging member 2 to be secured. A rear groove wall of the locking groove 13 is disposed with a guide wall, and ends of the plurality of locking members 221 are disposed with matching guide surfaces. The matching guide surfaces cooperate with the guide wall to achieve the aforementioned pushing (i.e., the hanger 11 disposed on the wall mount bracket 1 pushes the plurality of locking members 221 of the hanging member 2 to move outward).

The aforementioned embodiments are merely some embodiments of the present disclosure, and the scope of the disclosure is not limited thereto. Thus, it is intended that the present disclosure cover any modifications and variations of the presently presented embodiments provided they are made without departing from the appended claims and the specification of the present disclosure.

What is claimed is:

1. A wall mount base device, comprising:
a wall mount bracket, and
a hanging member configured to be hung on the wall mount bracket, wherein:
the wall mount bracket is disposed with a hanger,
the hanger comprises a locking groove,
the hanging member is disposed with a locking mechanism,
the locking mechanism comprises one or more locking members, a transmission mechanism, and an operating member,
the one or more locking members are configured to move between locked positions and released positions relative to the hanging member,
the operating member is movably connected to the hanging member,
the transmission mechanism is connected between the operating member and the one or more locking members to drive the one or more locking members to move due to a movement of the operating member, and
when the one or more locking members are disposed at the locked positions, the one or more locking members are disposed in the locking groove to enable the hanging member to be locked to the wall mount bracket.

2. The wall mount base device according to claim 1, wherein:
the hanging member is disposed with a sleeve groove,
when the one or more locking members are disposed at the locked positions, the one or more locking members protrude to be disposed in the sleeve groove, and
the sleeve groove of the hanging member is configured to detachably cooperate with and encompass an outer side of the hanger.

3. The wall mount base device according to claim 1, wherein:
the wall mount bracket is disposed with an abutting surface,
the hanger protrudes from the abutting surface, and
the abutting surface is disposed around the hanger.

4. The wall mount base device according to claim 1, wherein an annular groove disposed around the hanger defines the locking groove.

5. The wall mount base device according to claim 1, wherein:
the hanging member comprises one or more elastic members,
the one or more elastic members are connected between the locking mechanism and the hanging member to enable the locking mechanism to be reset, and
when the one or more locking members of the locking mechanism are reset, the one or more locking members are disposed at the locked positions.

6. The wall mount base device according to claim 1, wherein:
the transmission mechanism comprises a rotating circle configured to rotate relative to the hanging member,
the operating member is operatively connected to the rotating circle to drive the rotating circle to rotate,
the rotating circle is disposed with one or more cam surfaces,
the one or more locking members are configured to be slidably connected to the hanging member,
the one or more locking members are disposed with one or more matching portions, and
the one or more matching portions abut the one or more cam surfaces to drive the one or more locking members to slide due to a rotation of the rotating circle.

7. The wall mount base device according to claim 6, wherein:
the transmission mechanism comprises a push rod,
the push rod is disposed with a screw rack,
the rotating circle is disposed with a gear,
the gear is engaged with the screw rack, and
the operating member is operatively connected to the push rod to drive the push rod to slide.

8. The wall mount base device according to claim 6, wherein:
the one or more locking members comprise a plurality of locking members,
the plurality of locking members are circumferentially disposed at intervals,
sliding directions of the plurality of locking members are disposed in radial directions of the rotating circle,
the one or more cam surfaces comprise a plurality of cam surfaces, and
the plurality of cam surfaces are circumferentially disposed at intervals.

9. The wall mount base device according to claim 8, wherein:
a rear surface of the hanging member is concave to define a sleeve groove so as to define a blind hole type,
the sleeve groove comprises a groove bottom and a groove wall,
the rotating circle comprises a bottom wall and a peripheral wall axially extending from a periphery of the bottom wall,
the bottom wall is disposed in the hanging member and corresponds to the groove bottom,
the peripheral wall encompasses an outer side of the groove wall,
an outer peripheral surface of the peripheral wall is disposed with the plurality of cam surfaces,
inner ends of the plurality of locking members protrude to define the one or more matching portions,
the one or more matching portions abut the plurality of cam surfaces, and
outer ends of the plurality of locking members slides through the groove wall.

10. The wall mount base device according to claim 9, wherein one or more elastic members configured to enable the plurality of locking members to be reset are disposed between the plurality of locking members and the hanging member.

11. The wall mount base device according to claim 1, wherein the hanging member is a hand-held shower.

* * * * *